Figure 1:
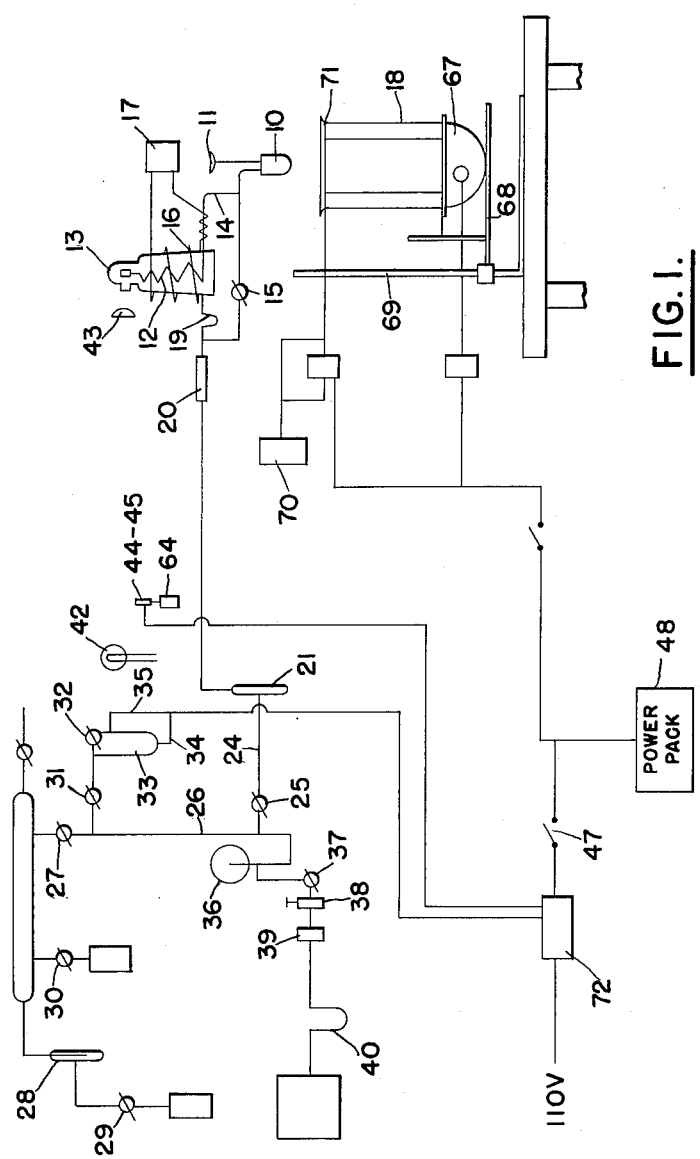

INVENTORS:
FRANK D. VERDERAME
KURT R. FISCH

2

United States Patent Office 3,028,747
Patented Apr. 10, 1962

3,028,747
DETERMINATION OF THE THERMAL DECOMPOSITION RATES OF COMPOUNDS
Frank D. Verderame, 1808 S. Dover St., Philadelphia, Pa., and Kurt R. Fisch, 2414 Wythe Court, Dayton, Ohio
Filed Aug. 16, 1960, Ser. No. 50,047
3 Claims. (Cl. 73—15)
(Granted under Title 35, U.S. Code (1952), sec. 266)

The invention desecribed herein may be manufactured and used by or for the Government for governmental purposes without the payment to us of any royalty thereon.

This invention relates to means for determining the thermal decomposition rates of compounds such as lubricants which are required to function at high temperatures. Its purpose is to provide an improved means of this type which requires less supervision than those heretofore available.

Various types of apparatus are available for determining the thermal decomposition rates of compounds at different temperatures. These apparatus generally require constant supervision. The present invention avoids this difficulty by automatizing the rate taking operation. As hereinafter explained, this result is largely achieved by means of a servo-mechanism which (1) is activated by change in the pressure generated by the tested compound, and (2) functions to measure and record such changes and to deenergize the apparatus upon the attainment of a predetermined pressure.

The invention will be better understood from the following description when considered in connection with the accompanying drawings and its scope is indicated by the appended claims.

Figure 2:
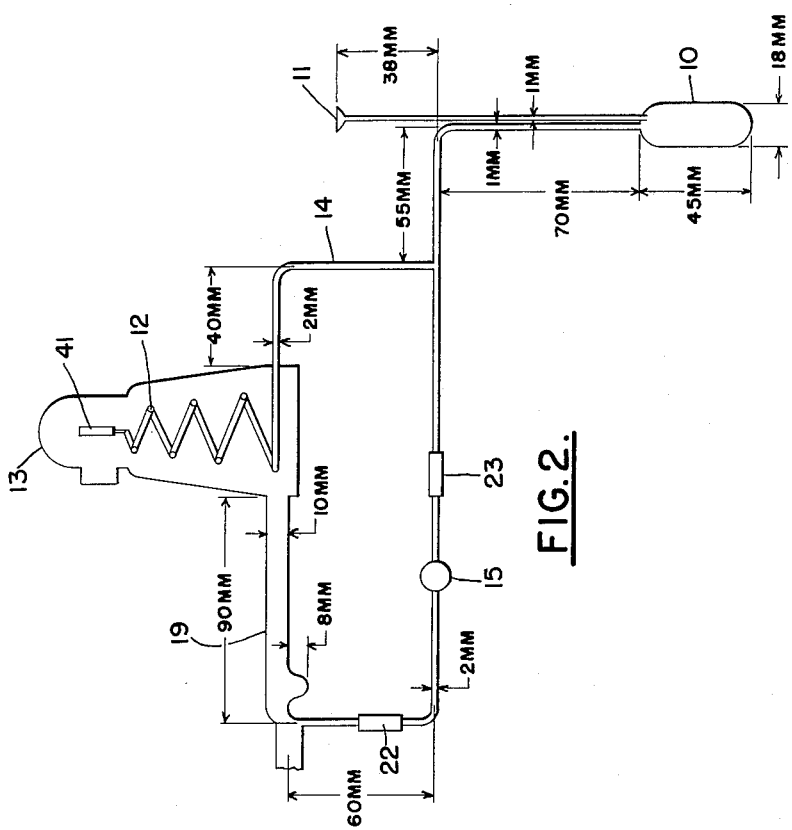
Figure 3:
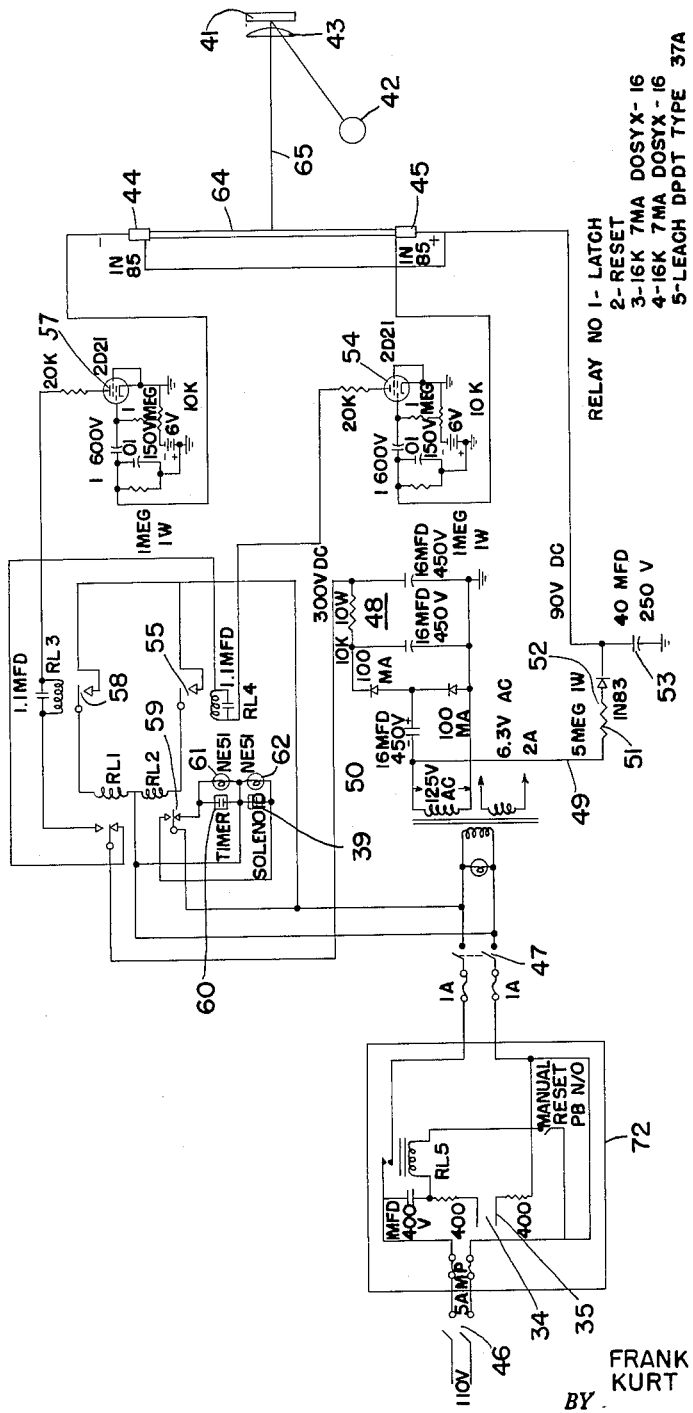

Referring to the drawings:

FIG. 1 illustrates the all glass system of the apparatus, certain electrical circuits being indicated by single lines, FIG. 2 is an enlarged view of a Bodenstein gauge and test cell which forms a part of the system of FIG. 1, and FIG. 3 illustrates the connections of the servomechanism which is controlled by the pressure developed in the Bodenstein gauge.

The system of FIG. 1 includes a test cell 10 to which the compound to be tested is introduced through a spherical joint 11. During the rate taking operation, the cell 10 is immersed in a constant temperature bath 18 provided with means hereinafter described for adjusting the cell to any desired temperature. The cell 10 is connected to the spiral 12 (FIG. 2.) of a Bodenstein gauge 13 through a pipe 14 and can be isolated from the body of this gauge by a stopcock 15. A heating coil 16, surrounding the pipe 14 and the body of the Bodenstein gauge, is energized from a 220v source through a voltage adjusting variac 17. The body of the Bodenstein gauge 13 is connected through a pipe 19, and a rubber tube 20 to trap 21. The gauge 13 and test cell 10 are supported in fixed relation to one another. The constant temperature bath 18 has means hereinafter described for raising and lowering it with respect to the cell 10.

From the trap 21 a pipe 24 leads through a stopcock 25 to a pipe 26. This pipe has three branches, one of which is connected (1) through a stopcock 27, a trap 28 and a stopcock 29 to a vacuum pump, and (2) through a stopcock 30 to a McLeod gauge. The second of these branches is connected through stopcocks 32 and 31 to a closed end mamometer 32 which has electric leads 34 and 35. The third of these branches is connected through a ballast flask 36, a stopcock 37, a needle valve 38, a solenoid-operated valve 39 and a drying tube 40 to a source of nitrogen under pressure.

As is well understood by those skilled in the art, the operation of the Bodenstein gauge is based on the relation between the gas pressure in the spiral 12 and the gas pressure surrounding this spiral. Thus when the pressure in the spiral increases above that surrounding the spiral, the spiral tends to unwind and vice versa. This effect is utilized (1) to regulate the pressure of the gas exterior to the spiral, (2) to provide a measure of the gas pressure within the spiral, and (3) to deenergize the apparatus when the pressure within the spiral attains a predetermined value.

To this end, a mirror 41 mounted on the spiral 12 is arranged to cooperate with a light source 42 and a lens 43 to control the conductivity of a pair of light sensitive cells 44 and 45 (FIG. 3). Voltage for the operation of cells 44 and 45 is applied from a 110 volt input through switches 46 and 47 and a power pack 48 which has output leads 49 and 50. The lead 49 is connected through a resistor 51 and a rectifier to the positive terminals of the cells 44 and 45, a capacitor 53 being connected between this terminal and ground.

The negative terminal of the cell 45 is connected to the lead 50 through an amplifier 54, the operating coil of a switch 55 and the contacts of a relay 56. The negative terminal of the cell 44 is connected through an amplifier 57 and the operating coil of a switch 58 to a contact of the relay 56. A relay 59 functions as hereinafter described to control the operation of the solenoid-operated valve 39 (FIGS. 1 and 3) and to operate a counter or timer 60. Indicators 61 and 62 are connected across the timer 60 and the solenoid coil 39. A relay 63 located in a control box 72 is connected to the input 46 (FIG. 3) through the closed end manometer 33 (FIG. 1) for disconnecting the system when the pressure within the spiral 12 builds up to a predetermined value.

The light source 42, located above the photocells 44 and 45, is a focusing galvanometer lamp having its face masked to pass a vertical light beam 3.8 mm. wide. The focal length of the lens 43 is 1 meter. The reflected image is focused on the millimeter scale and photoelectric cells which are spaced from the mirror face by 100±1 cm. Once set up in this manner, the sensitivity of the gauge 13 can be measured in a dry run using nitrogen on the cell side, and is defined as the pressure in millimeters of mercury required to cause a horizontal displacement of 1 mm. of the light image on the scale 64 at a distance of one meter. It is desirable to use a gauge having a sensitivity of not more than 2:1.

The photoelectric cells are two 1N85 transistors. They are mounted on the scale 64 so as to allow quick adjustment in their respective positions. The light source and Bodenstein gauge are alined so that the reflected light image is cast on both the cell and scale simultaneously. The distance traversed by the light beam is determined by measuring the distance one edge of the light beam travels between actuation of the cells. The distance between the cells may be changed at successive determinations depending on the rate of pressure increase.

The timer 60 is an Esterline Angus milliammeter. Its gears are adjusted to give a chart speed of ¾ inch per minute. A deflection of the needle occurs each time the timer is actuated. The time between peaks is read to within 3 seconds and estimated to 1 second.

The circuit of FIG. 3 is shown in its reset condition with the reflected beam 65 moving from the photocell 44 toward the photocell 45 as the pressure difference inside and outside the spiral 12 increases. When the beam 65 reaches the cell 45, the tube 54 conducts, the switch 55 is closed, and the switches 56 and 59 are moved to their upper closed position. In this position the switch 6 connects the photocell 44 to the power pack 48 and the switch 59 connects solenoid operated valve 39 to the power pack 48. This operates the valve 39 to a position such that nitrogen under pressure is admitted to the space surrounding the spiral 12.

When the pressures inside and outside the spiral are equalized, the mirror 41 moves the beam 65 back to the photocell 44. This causes the tube 57 to conduct, thereby closing switch 58 which completes a circuit to the upper operating coil of switches 56 and 59. As a result the switch 56 completes a circuit to the photocell 45 and the switch 59 completes a circuit to the timer 60. This leaves the apparatus in condition for a repetition of the above described cycle.

When the pressure within the spiral 12 attains a predetermined value, the leads 34 and 35 to the closed end manometer are short circuited and a switch 66 is actuated to deenergize the apparatus. The contacts of the manometer 33 have a relation such that, when a pressure of approximately 700 mm. Hg is built up, all 110 v. lines which are plugged into the safety relay box are disconnected and can only be reset manually. In addition to terminating the test automatically, the described system also prevents erratic results because of temporary power breaks or other interruptions.

The first step in the operation of the system is the heating of the bath 18 (FIG. 1) to a constant temperature. This is a salt bath consisting of a eutectic mixture of 27.3% Li $NO_3$, 18.27% Na $NO_3$ 54.4% $KNO_3$ (M.P. approximately 250° F.), in a round bottom, cylindrical Pyrex glass vessel 18 (4 in. diameter, 11.5 in. high). The bath is kept permanently above its melting point by a 250 watt, 500 ml. quarts heating mantle 67. The sidewalls are insulated with a 1-inch layer of glass wool, held in place by a concentric glass cylinder. The bath rests on a sturdy steel plate 68 which may be raised or lowered on a ring stand 69.

The temperature of the bath is regulated by a Leeds and Northrup Electromax 70 with a "Thermohm" sensing element, and a 500 watt, 120 volt control "hairpin" immersion heater. With this arrangement, the temperature can be controlled to ±0.1° F. up to approximately 900° F. A calibrated platinum resistance thermometer 71 using a portable precision Wheatstone bridge and galvanometer is used for temperature determinations.

In operating the above described apparatus, the following operations are performed while waiting for the bath to attain a constant temperature:

(1) The test cell 10 is cleaned with appropriate solvent. Ethyl acetate is used to remove stopcock and joint sealants (Apiezon T stopcock grease and Apiezon wax, Metropolitan Vickers Electric Co., Ltd., England). The cell is dried in an oven, then placed in its prealigned position and evacuated by means of a water aspirator while heating it with the resistance wire 16 to complete dryness. The aspirator is disconnected and the cell connected to the gas measuring section with rubber tubing 20.

(2) Three cc. of test fluid are injected through the spherical joint 11 of the test cell and the joint is then sealed with Apiezon wax. All 110 v. lines are plugged into the safety relay box. The lamp 42, photo cells 44—45, lens 43, and gauge 13 are adjusted so that a sharp light image is produced on cell 44. The nitrogen inlet valve 38 remains closed.

(3) With stopcock 15 open, the system is completely evacuated. The nitrogen inlet valve 38 is opened and the entire system flushed 5 times with 100 mm. portions of nitrogen and evacuated each time. With stopcock 15 closed, and stopcock 27 and the nitrogen inlet valve 38 slightly open, the light image is made to move slowly between cell 44 and cell 45 by alternately admitting nitrogen then allowing it to evacuate. In this manner adjustments in the proper operation and sensitivity of the cells can be made by adjusting the variable resistors in the control box. The distance traversed by the image is measured on the scale 64 by using one edge of the light image as reference point between cell actuations. The pump is then shut off and stopcocks 27, 29 and 15 closed. Nitrogen is slowly admitted to move the image to cell 44 and the distance the light travels to activate cell 44 as well as the change in pressure on the manometer 33 are noted. Stopcock 15 is slowly opened to move the beam back to cell 45 to determine the distance traveled. Stopcock 15 is closed and again nitrogen is admitted to move the beam back to cell 44. The pressure increase is read again. This pressure should correspond to the distance the light beam travels multiplied by the sensitivity of the gauge.

(4) With the nitrogen valve 38 closed and stopcock 15 opened, the entire system is completely evacuated to about 7 microns. Stopcock 27 is closed and the system checked for leaks by noting pressure rise after 10 to 15 minutes (no rise should be discernible).

(5) Stopcock 27 is opened and the heating coil 16 of the gauge is turned on to raise the temperature about 20° C. above the bath temperature. The test cell 10 is degassed by heating gently with a Bunsen burner. The gauge should be hot before degassing.

(6) When the pressure is at a minimum again (approx. 7 microns were obtained without the use of the diffusion pump) and the bath temperature becomes constant, stopcocks 27, 29 and 15 (in that order) are closed and the pump is shut off. The nitrogen inlet valve 38 is opened ¼ turn, causing the light to move from cell 45 toward cell 44 admitting a pressure of nitrogen equivalent to the distance between cells.

After attaining constant temperature, the bath 18 is raised to completely cover the test cell 10. (In order to avoid damage to the bath or cell, a bumper clamp was set on the ring stand at the proper height.)

The vapor pressure of the fluid at this temperature can be estimated when desired in the following manner: When the cell is first immersed in the salt bath the rapid increase of pressure causes rapid cell activation until the pressure approaches equilibrium and the rate of travel of the light image 65 becomes much slower. Since the test is started with the image at cell 44, the pressure increment times the number of cell activations, plus the distance from cell 44 at which the reference edge of the light image comes to rest, multiplied by the sensitivity of the gauge gives a good approximation of the vapor pressure. The beginning and end of these determinations are marked on the timer chart. The determination then becomes automatic.

At the end of the test, the bath is lowered and the temperature decreased 15 to 25° C. by temporary immersion of the copper cooling coil. The entire system is reevacuated prior to measurements at this lower temperature.

At the end of the test, the bath is lowered while the gauge heating coil is left on until the test cell has attained ambient temperature. Stopcocks 15 and 27 are opened and the entire system is evacuated. This is follower by admission of nitrogen to atmospheric pressure.

We claim:

1. The combination of means for maintaining at a constant temperature a compound which generates a gas pressure upon its thermal decomposition, a gauge including an element movable upon a difference in pressures applied to its opposed surfaces, a mirror movable with said element, means for applying said generated gas pressure to one of said surfaces, means for directing a light beam to said mirror, a scale, a pair of photoelectric cells supported by and movable along said scale, said photoelectric cells being spaced apart and so located that the light beam reflected from said mirror strikes one of said cells when the pressures at the opposed surfaces of said element are equal and moves toward the other of said cells as the difference between said pressures increases, a source of gas pressure, and valve means actuated when said reflected beam reaches said other cell to admit from said source to the other of said opposed surfaces a pressure whereby the pressures at the opposed surfaces of said element are equalized.

2. A combination according to claim 1 wherein means are provided for recording in timed relation the successive operations of said valve means.

3. A combination according to claim 1 wherein means are provided for deactivating said valve means when said generated gas pressure attains a predetermined value.

References Cited in the file of this patent

UNITED STATES PATENTS

| 2,259,446 | Barnhart | Oct. 21, 1941 |
| 2,504,143 | Moore | Apr. 18, 1950 |
| 2,795,132 | Boehme et al. | June 11, 1957 |

FOREIGN PATENTS

| 899,173 | France | June 31, 1944 |
| 900,220 | France | Sept. 25, 1944 |